(12) United States Patent
Lee et al.

(10) Patent No.: US 11,889,586 B2
(45) Date of Patent: *Jan. 30, 2024

(54) METHOD AND APPARATUS FOR NEGOTIATING EUICC VERSION

(71) Applicant: SAMSUNG ELECTRONICS CO., LTD., Suwon-si (KR)

(72) Inventors: Hyewon Lee, Suwon-si (KR); Jonghan Park, Suwon-si (KR); Duckey Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/045,124

(22) Filed: Oct. 7, 2022

(65) Prior Publication Data
US 2023/0114895 A1    Apr. 13, 2023

Related U.S. Application Data

(63) Continuation of application No. 17/045,481, filed as application No. PCT/KR2019/004071 on Apr. 5, 2019, now Pat. No. 11,470,465.

(30) Foreign Application Priority Data

Apr. 6, 2018   (KR) .................... 10-2018-0040604

(51) Int. Cl.
*H04L 9/40*     (2022.01)
*H04W 12/30*    (2021.01)
(Continued)

(52) U.S. Cl.
CPC ............. *H04W 8/205* (2013.01); *H04L 67/02* (2013.01); *H04W 4/60* (2018.02); *H04W 8/183* (2013.01);
(Continued)

(58) Field of Classification Search
CPC ....... H04W 8/205; H04W 4/60; H04W 8/183; H04W 12/06; H04W 12/35; H04W 88/18; H04W 12/40; H04W 88/02; H04L 67/02; H04L 63/0853; H04L 69/24; H04L 67/30
See application file for complete search history.

(56) References Cited

U.S. PATENT DOCUMENTS 9,009,475 B2    4/2015  Hauck et al.
11,470,465 B2 * 10/2022  Lee .......................... H04W 4/60
(Continued)

FOREIGN PATENT DOCUMENTS

| EP | 3297309 A1 | 3/2018 |
|---|---|---|
| KR | 10-2017-0074752 A | 6/2017 |
| WO | 2017082697 A1 | 5/2017 |

OTHER PUBLICATIONS

Notification of Transmittal of the International Search Report and the Written Opinion of the International Searching Authority, or the Declaration dated Jul. 12, 2019 in connection with International Patent Application No. PCT/KR2019/004071, 9 pages.
(Continued)

*Primary Examiner* — Joseph E Dean, Jr.

(57) ABSTRACT

A method, performed by a terminal, of negotiating an embedded universal integrated circuit card (eUICC) version in a wireless communication system includes: establishing a hypertext transfer protocol over secure socket layer (HTTPS) connection with a server transmitting eUICC information including information about the eUICC version to the server through the HTTPS connection; and receiving server information corresponding to the eUICC information from the server, wherein the information about the eUICC version includes a minimum eUICC version and a maximum eUICC version that are available when the terminal accesses the server.

20 Claims, 10 Drawing Sheets

(51) Int. Cl.
| | |
|---|---|
| *H04W 8/20* | (2009.01) |
| *H04W 4/60* | (2018.01) |
| *H04L 67/02* | (2022.01) |
| *H04W 8/18* | (2009.01) |
| *H04W 12/06* | (2021.01) |
| *H04W 88/18* | (2009.01) |

(52) U.S. Cl.
CPC ........... *H04W 12/06* (2013.01); *H04W 12/35* (2021.01); *H04W 88/18* (2013.01)

(56) References Cited

U.S. PATENT DOCUMENTS

| | | |
|---|---|---|
| 2014/0244994 A1 | 8/2014 | Yu |
| 2014/0329502 A1 | 11/2014 | Lee et al. |
| 2017/0142121 A1 | 5/2017 | Lee et al. |
| 2017/0338962 A1 | 11/2017 | Li et al. |
| 2019/0121797 A1 | 4/2019 | Dumoulin et al. |
| 2019/0324735 A1 | 10/2019 | Park |

OTHER PUBLICATIONS

Supplementary European Search Report dated Apr. 8, 2021 in connection with European Application No. 19782012.9, 10 pages.
GSM Association, "RSP Technical Specification," Version 1.0, Official Document SGP.22, Jan. 13, 2016, 114 pages.
Communication pursuant to Article 94(3) EPC dated Jan. 19, 2023 in connection with European Patent Application No. 19 782 012.9, 7 pages.
The First Office Action dated Jul. 11, 2023 in connection with Chinese Patent Application No. 201980022773.0, 14 pages.

\* cited by examiner

METHOD AND APPARATUS FOR NEGOTIATING EUICC VERSION

CROSS-REFERENCE TO RELATED APPLICATIONS

This application is a continuation of application Ser. No. 17/045,481, now U.S. Pat. No. 11,470,465 issued Oct. 11, 2022, which is a 371 of International Application No. PCT/KR2019/004071 filed on Apr. 5, 2019, which claims priority to Korean Patent Application No. 10-2018-0040604 filed on Apr. 6, 2018, the disclosures of which are herein incorporated by reference in their entirety.

BACKGROUND

1. Field

The disclosure relates to a method and apparatus for negotiating an embedded subscriber identification module (eSIM) version.

2. Description of Related Art

In order to meet the increasing demand with respect to wireless data traffic since the commercialization of 4G communication systems, efforts have been made to develop improved 5G communication systems or pre-5G communication systems. For this reason, 5G communication systems or pre-5G communication systems are called Beyond 4G network communication systems or Post LIE systems. In order to achieve a high data transfer rate, consideration is given to implementing 5G communication systems in millimeter wave (mmW) frequency bands (e.g., 60 GHz bands). In order to reduce propagation path loss and increase a propagation distance in the millimeter wave frequency bands, in 5G communication systems, discussions are underway about technologies such as beam-forming, massive multiple input multiple output (MIMO), full dimensional MIMO (FD-MIMO), array antenna, analog beam-forming, and large scale antenna. Also, in order to improve networks of systems, in 5G communication systems, developments of technologies such as evolved small cell, advanced small cell, cloud radio access network (cloud RAN), ultra-dense network, device to device communication (D2D), wireless backhaul, moving network, cooperative communication, coordinated multi-points (CoMP), and interference cancellation are underway. Furthermore, in 5G communication systems, developments of an advanced coding modulation (ACM) scheme such as hybrid FSK and QAM modulation (FQAM) and sliding window superposition coding (SWSC) and an enhanced network access scheme such as filter bank multi carrier (FBMC), non-orthogonal multiple access (NOMA), or sparse code multiple access (SCMA) are underway.

The Internet is evolving from a human-centered connection network through which humans create and consume information to an Internet of Things (IoT) network through which distributed elements, such as objects, exchange and process information. Internet of Everything (IoE) technology, which is a combination of IoT technology and big data processing technology through connection with a cloud server, is also emerging. In order to implement the IoT, technology elements such as sensing technology, wired/wireless communication and network infrastructure, service interface technology, and security technology are required, and thus technology for inter-object connection, such as a sensor network, machine to machine (M2M) communication, or machine type communication (MTC), has recently been studied. In an IoT environment, intelligent Internet technology (IT) services that collect and analyze data generated by connected objects and create new value in human life may be provided. The IoT may be applied to fields such as smart homes, smart buildings, smart cities, smart cars or connected cars, smart grids, health care, smart home appliances, and advanced medical services through convergence and integration of existing information technology (IT) and various industries.

Various attempts are made to apply 5G communication systems to IoT networks. For example, technology such as a sensor network, M2M communication, or MTC is implemented by 5G communication technology such as beam-forming, MIMO, or array antenna. The application of a cloud RAN as big data processing technology may also be considered as an example of convergence of 5G technology and IoT technology.

Because mobile communication systems may provide various services due to the development of the above mobile communication systems, methods of effectively providing the services are required.

SUMMARY

According to an embodiment of the disclosure, a method, performed by a terminal, of negotiating an embedded universal integrated circuit card (eUICC) version in a wireless communication system includes: establishing a hypertext transfer protocol over secure socket layer (HTTPS) connection with a server; transmitting eUICC information including information about the eUICC version to the server through the HTTPS connection; and receiving server information corresponding to the eUICC information from the server, wherein the information about the eUICC version includes a minimum eUICC version and a maximum eUICC version that are available when the terminal accesses the server.

According to an embodiment of the disclosure, apparatuses and methods capable of effectively providing services in mobile communication systems are provided.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
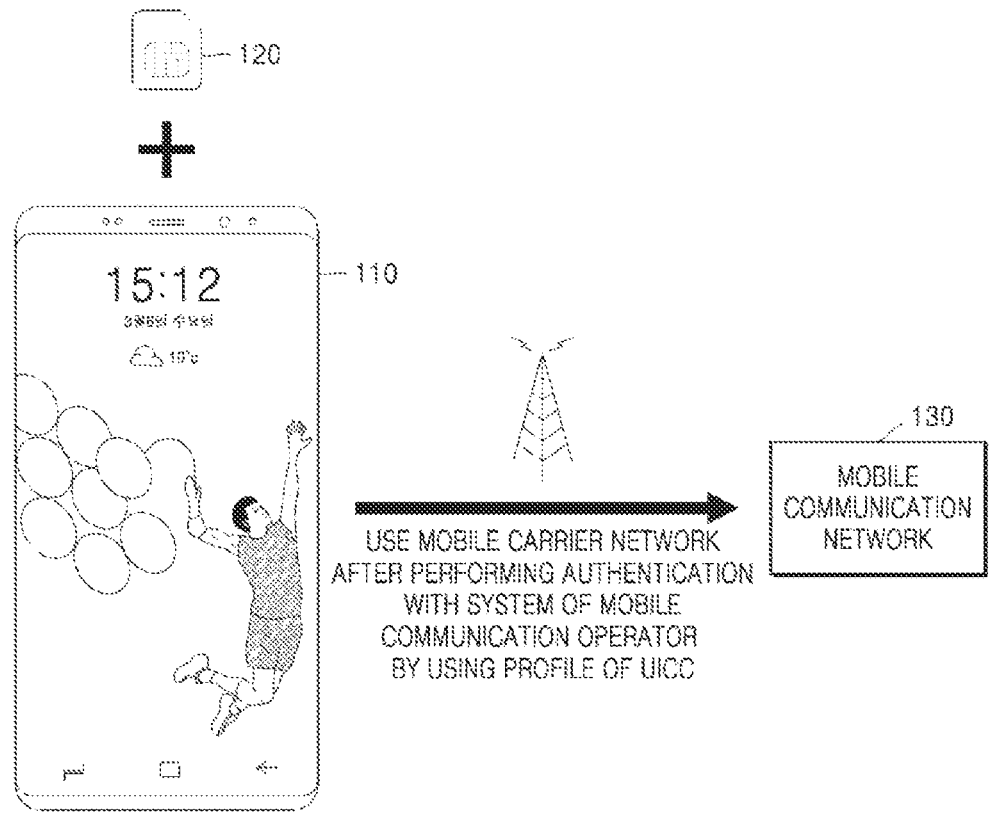
FIG. 1 is a diagram illustrating a mobile communication network connection method of a terminal using a universal integrated circuit card (UICC) in which a fixed profile is installed, according to an embodiment of the disclosure.

Provided are apparatuses and methods capable of effectively providing services in mobile communication systems.

Additional aspects will be set forth in part in the description which follows and, in part, will be apparent from the description, or may be learned by practice of the presented embodiments of the disclosure.

According to an embodiment of the disclosure, a method, performed by a terminal, of negotiating an embedded universal integrated circuit card (eUICC) version in a wireless communication system includes: establishing a hypertext transfer protocol over secure socket layer (HTTPS) connection with a server; transmitting eUICC information including information about the eUICC version to the server through the HTTPS connection; and receiving server information corresponding to the eUICC information from the server, wherein the information about the eUICC version includes a minimum eUICC version and a maximum eUICC version that are available when the terminal accesses the server.

The server information corresponding to the eUICC information may include information about a server version, wherein the method further includes determining that the server version is same as the maximum eUICC version.

The server information corresponding to the eUICC information may not include information about a server version, wherein the method further includes determining that the server version is same as the minimum eUICC version.

The server information corresponding to the eUICC information may include an error message, wherein the method further includes determining that the server does not support the eUICC version supported by the terminal.

The information about the eUICC version may include a list of all or some of functions defined by a protocol of the eUICC version.

The list may be written by using a bitmap.

The method may further include performing an authentication process with the server based on the server information corresponding to the eUICC information.

According to another embodiment of the disclosure, a method, performed by a server of negotiating an embedded universal integrated circuit card (eUICC) version in a wireless communication system includes: establishing a hypertext transfer protocol over secure socket layer (HTTPS) connection with a terminal; receiving eUICC information including information about the eUICC version from the terminal through the HTTPS connection; and transmitting server information corresponding to the eUICC information to the terminal, wherein the information about the eUICC version includes a minimum eUICC version and a maximum eUICC version that are available when the terminal accesses the server.

The transmitting of the server information corresponding to the eUICC information may include, when the server supports both the minimum eUICC version and the maximum eUICC version or supports the maximum eUICC version, generating the server information including information about a server version corresponding to the maximum eUICC version.

The information about the server version may include a list of all or some of functions defined by a protocol of the server version.

The list may be written by using a bitmap.

The transmitting of the server information corresponding to the eUICC information to the terminal may include, when the server supports the minimum eUICC version, generating the server information not including information about a server version.

The transmitting of the server information corresponding to the eUICC information to the terminal may include, when the server does not support the eUICC version supported by the terminal, generating the server information including an error message.

The method may further include performing an authentication process with the terminal based on the server information corresponding to the eUICC information.

According to another embodiment of the disclosure, a terminal negotiating an embedded universal integrated circuit card (eUICC) version in a wireless communication system includes: a transceiver; and at least one processor coupled with the transceiver and configured to: establish a hypertext transfer protocol over secure socket layer (HTTPS) connection with a server; transmit eUICC information comprising information about the eUICC version to the server through the HTTPS connection; and receive server information corresponding to the eUICC information from the server, wherein the information about the eUICC version comprises a minimum eUICC version and a maximum eUICC version that are available when the terminal accesses the server.

According to another embodiment of the disclosure, a server negotiating an embedded universal integrated circuit card (eUICC) version in a wireless communication system includes: a transceiver; and at least one processor coupled with the transceiver and configured to: establish a hypertext transfer protocol over secure socket layer (HTTPS) connection with a terminal; receive eUICC information comprising information about the eUICC version from the terminal through the HTTPS connection; and transmit server information corresponding to the eUICC information to the terminal, wherein the information about the eUICC version comprises a minimum eUICC version and a maximum eUICC version that are available when the terminal accesses the server.

Hereinafter, embodiments of the disclosure will be described in detail with reference to the accompanying drawings.

In the following description of embodiments of the disclosure, descriptions of techniques that are well known in the art and not directly related to the disclosure are omitted.

This is to clearly convey the gist of the disclosure by omitting any unnecessary explanation.

For the same reason, some elements in the drawings are exaggerated, omitted, or schematically illustrated. Also, a size of each element does not entirely reflect a real size. In the drawings, the same or corresponding elements are denoted by the same reference numerals.

The advantages and features of the disclosure and methods of achieving the advantages and features will become apparent with reference to embodiments of the disclosure described in detail below with reference to the accompanying drawings. The disclosure may, however, be embodied in many different forms and should not be construed as limited to the embodiments of the disclosure set forth herein. Rather, these embodiments of the disclosure are provided so that this disclosure will be thorough and complete, and will fully convey the scope of the disclosure to one of ordinary skill in the art, and the disclosure is only defined by the scope of claims. Like reference numerals denote like elements throughout.

It will be understood that each block of flowchart illustrations and combinations of blocks in the flowchart illustrations may be implemented by computer program instructions. These computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block or blocks. These computer program instructions may also be stored in a computer-usable or computer-readable memory that may direct a computer or other programmable data processing apparatus to function in a particular manner, such that the instructions stored in the computer-usable or computer-readable memory produce a manufactured article including instruction means that perform the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable data processing equipment provide steps for implementing the functions specified in the flowchart block or blocks.

In addition, each block may represent a module, segment, or portion of code, which includes one or more executable instructions for implementing specified logical function(s). It should also be noted that in some alternative implementations, the functions noted in the blocks may occur out of the presented order. For example, two blocks shown in succession may in fact be executed substantially concurrently or the blocks may sometimes be executed in the reverse order, depending upon the functionality involved.

The term "unit", as used herein, may refer to a software or hardware component such as a field programmable gate array (FPGA) or an application specific integrated circuit (ASIC), which performs certain tasks. However, the term "unit" is not limited to software or hardware, but may be configured to reside on an addressable storage medium and configured to execute one or more processors. Thus, the unit may include, by way of example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionality provided in the components and units may be combined into fewer components and units or further separated into additional components and units. In addition, the components and units may be implemented to operate one or more central processing units (CPUs) in a device or a secure multimedia card.

Specific terms used in the detailed description are provided for better understanding of the disclosure, and may be modified in various ways without departing from the scope of the disclosure.

The term "universal integrated circuit card (UICC)", as used herein, refers to a smart card inserted into and used in a mobile communication terminal. The term "UICC" refers to a chip that stores personal information of a mobile communication subscriber such as authentication information for network access, a phone number list, or short message service (SMS) messages and performs subscriber authentication and traffic security key generation when access is made to a mobile communication network such as global system for mobile communications (GSM), wideband code division multiple access (WCDMA), or long-term evolution (LTE), thereby making it possible to stably use mobile communication. A UICC is embedded with a communication application such as a subscriber identification module (SIM), a universal SIM (USIM), or an IP multimedia SIM (ISIM), according to a type of a mobile communication network accessed by a subscriber. A UICC including a USIM is generally referred to as a USIM card and a UICC including a SIM module is generally referred to as a SIM card.

In addition, a UICC may provide a high-level security function for loading various applications such as an electronic wallet, ticketing, and an electronic passport.

The term "embedded UICC (eUICC)", as used herein, refers to a chip-type security module embedded in a terminal, rather than one detachably inserted into the terminal. An eUICC may download and install a profile by using over-the-air (OTA) technology. An eUICC may be a UICC capable of downloading and installing a profile. A method of downloading and installing a profile on an eUICC by using OTA technology may also be applied to detachable UICCs detachably inserted into terminals. That is, various embodiments of the disclosure may be applied to UICCs capable of downloading and installing a profile by using an OTA technique.

The term "UICC", as used herein, may be interchangeably used with the term "SIM", and the term "eUICC" may be interchangeably used with the term "eSIM". Also, "a SIM card", "a UICC card", "a USIM card", and "a UICC including an ISIM" may be used as elements having the same meaning. That is, embodiments of the disclosure may be applied to SIM cards, USIM cards, ISIM cards, or general UICC cards.

The term "profile", as used herein, may refer to a software package of an application, a file system, an authentication key value, and the like that are stored in a UICC.

The term "USIM profile", as used herein, may refer to a profile, or a software package of information contained in a USIM application of a profile.

The term "profile server", as used herein, may include a function of generating a profile, encrypting a generated profile, generating a profile remote management command), or encrypting a generated profile remote management command. The term "profile server" may be represented by subscription manager data preparation (SM-DP), subscription manager data preparation plus (SM-DP+), off-card entity of profile domain, profile encrypting server, profile generating server, profile provisioner (PP), profile provider, or profile provisioning credentials (PPC) holder.

The term "profile management server", as used herein, may include a function of managing a profile. The term "profile management server" may be represented by subscription manager secure routing (SM-SR), subscription manager secure routing plus (SM-SR+), off-card entity of eUICC profile manager, profile management credentials (PMC) holder, or eUICC manager (EM).

The term "profile server", as used herein, may refer to a server including functions of a profile management server. According to an embodiment of the disclosure, an operation of a profile server may thus be performed by a profile management server. Likewise, an operation of a profile management server or an SM-SR may also be performed by a profile server.

The term "intermediary server", as used herein, may be represented by a subscription manager discovery service (SM-DS), a discovery service (DS), a root SM-DS, or an alternative SM-DS. An intermediary server may receive an event registration request from one or more profile servers or intermediary servers. Also, one or more intermediary servers may be used in combination, and in this case, a first intermediary server may receive an event registration request from not only a profile server but also a second intermediary server.

The terms "profile server" and "intermediary server", as used herein, may be referred to by a single name, "remote SIM provisioning (RSP) server". The term "RSP server" may be represented by "subscription manager XX" (SM-XX).

The term "terminal", as used herein, may be referred to as a mobile station (MS), user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or others. Examples of a terminal may include a cellular phone, a smart phone having a wireless communication function, a personal digital assistant (PDA), a wireless modem, a portable computer having a wireless communication function, an imaging apparatus such as a digital camera having a wireless communication function, a gaming apparatus having a wireless communication function, a home appliance for storing and playing music having a wireless communication function, an Internet home appliance capable of wireless Internet access and browsing, and a portable unit or terminal having a combination of the above functions. Further, examples of a terminal may include, but are not limited to, an M2M terminal and an MTC terminal/device. In the disclosure, a terminal may be referred to as an electronic apparatus.

In the disclosure, an electronic apparatus may be embedded with a UICC, which may download and install a profile. When a UICC is not embedded in an electronic apparatus, the UICC physically separated from the electronic apparatus may be inserted into the electronic apparatus to be connected to the electronic apparatus. For example, the UICC may be inserted into the electronic apparatus in a card form. The electronic apparatus may include a terminal. In this case, the terminal may be a terminal including the UICC which may download and install the profile. The UICC may be embedded in the terminal, or when the terminal is separated from the UICC, the UICC, may be inserted into the terminal to be connected to the terminal. The UICC which may download and install the profile may be referred to as, for example, an eUICC.

The terminal or the electronic apparatus may include software or an application installed in the terminal or the electronic apparatus to control the UICC or the eUICC. The software or the application may be referred to as, for example, a local profile assistant (LPA).

The term "profile differentiator (or profile delimiter)", as used herein, may be referred to as a profile identifier (profile ID), an integrated circuit card ID (ICCID), a matching ID, an event identifier (event ID), activation code, an activation code token, an issuer security domain profile (ISD-P) or a factor matching a profile domain (PD). The term "profile ID" may denote a unique identifier of each profile. A profile differentiator may contain an address of a profile server (SM-DP+) capable of indexing a profile.

The term "eUICC identifier (eUICC ID)", as used herein, may refer to a unique identifier of an eUICC embedded in a terminal and may be referred to as an EID. Further, when a provisioning file is previously included in an eUICC, an eUICC ID may be an identifier of the provisioning profile. According to an embodiment of the disclosure, when a terminal is not separated from an eUICC chip, an eUICC ID may be a terminal ID. Also, an eUICC ID may denote a particular security domain of an eUICC chip.

The term "profile container", as used herein, may be referred to as a profile domain. A profile container may be a security domain.

The term "application protocol data unit (APDU)", as used herein, may be a message for a terminal to interwork with an eUICC. Also, an APDU may be a message for a profile server, a profile provider (PP), or a profile manager (PM) to interwork with an eUICC.

The term "PPC", as used herein, may be a means used for mutual authentication, profile encryption, and signing between a profile server and an eUICC. A PPC may include at least one of a symmetric key, a Rivest Shamir Adleman (RSA) certificate and private key, an elliptic curved cryptography (ECC) certificate and private key, or, a root certification authority (CA) and certificate chain. Further, when multiple profile servers are provided, different PPCs may be stored in an eUICC or used for the multiple profile servers.

The term "profile management credentials (PMC)", as used herein, may be a means used for mutual authentication, transmission data encryption, and signing between a profile management server and an eUICC. A PMC may include at least one of a symmetric key, an RSA certificate and private key, an ECC certificate and private key, or a root CA and certificate chain. Further, when multiple profile management servers are provided, different PMCs may be stored in an eUICC or used for the multiple profile management servers.

The term "AID", as used herein, may be an application identifier. This value may be a differentiator for distinguishing a specific application from another application in an eUICC.

In the disclosure, the term "event" may refer to profile download, remote profile management, or other profile or eUICC management/processing command. The term "event" may be referred to as a remote SIM provisioning operation (RSP) operation or event record, and each event may be referred to as data including at least one of an event identifier (event ID) or a matching identifier (matching ID) corresponding to the event, a profile server (SM-DP+) in which the event is stored, or an address (e.g., a fully qualified domain name (FQDN), an Internet protocol (IP) address, or a uniform resource locator (URL)) of an intermediary server (SM-DS). Profile download may be interchangeably used with profile installation. Further, the term "event type" may be used to indicate whether a specific event is profile download, remote profile management, or other profile or eUICC management/processing command, and the term "event type" may be referred to as an operation type (or OperationType), an operation class (or OperationClass), event request information, an event request type, an event class, or an event request class. When it is obvious that an operation type corresponds to a specific event according to a terminal or a server, transmission of the operation type may be omitted.

In the disclosure, the term "profile package" may be interchangeably used with a profile or may be used to indicate a data object of a specific profile, and may be referred to as a profile tag-length-value (TLV) or profile package TLV. When a profile package is encrypted by using an encryption parameter, the profile package may be referred to as a protected profile package (PPP) or a protected profile package TLV (PPP TLV). When a profile package is encrypted by using an encryption parameter that may be decrypted only by a specific eUICC, the profile package may be referred to as a bound profile package (BPP) or a bound profile package TLV (BPP TLV). A profile package TLV may be a data set representing information that constitutes a profile in a TLV format. The term "profile metadata", as used herein, may be used to indicate all or some of data objects of a profile package, and may be referred to as a profile metadata TLV.

In the disclosure, the term "remote profile management (RPM)" may be referred to as profile remote management, remote management, remote management command, remote command, RPM package, profile remote management package, remote management package, remote management command package, or remote command package. The term "RPM" may be used to change a state (e.g., enabled, disabled, or deleted) of a specific profile or to update content of a specific profile (e.g., a profile nickname or profile metadata). Each "RPM" may include one or more remote management commands, and in this case, profiles that are objects of the remote management commands may be the same or may be different from one another.

The term "certificate" or "digital certificate" may refer to a digital certificate used for mutual authentication based on an asymmetric key including a pair of a public key (PK) and a secret key (SK). Each certificate may include one or more PKs, a public key identifier (PKID) corresponding to each PK, an ID of a certificate issuer (CI) issuing the certificate, and a digital signature. Also, the term "CI" may be referred to as a certification issuer, a CA, or certification authority. The term "PK" and the term "PKID" may be interchangeably used with a specific PK or a certificate including the specific PK, a part of a specific PK or a part of a certificate including the specific PK, a calculation result (e.g., hash) value of a specific PK or a calculation result (e.g., hash) value of a certificate including the specific PK, a calculation result (e.g., hash) value of a part of a specific PK or a calculation result (e.g., hash) value of a part of a certificate including the specific PK, or a storage space in which data is stored.

When certificates (primary certificates) issued by one CI are used to issue other certificates (secondary certificates) or secondary certificates are continuously used to issue tertiary or more certificates, a correlation between the certificates may be referred to as a certificate chain or certificate hierarchy. In this case, a CI certificate used to initially issue a certificate may be referred to as a root of certificate, a root certificate, a root CI, a root CI certificate, a root CA, or a root CA certificate.

The term "version" may refer to a version of a protocol supported by a specific entity, and may be represented by a specification version number (SVN). For example, an LPA version (or an LPA SVN) may be used to indicate a version of a protocol supported by an LPA in a terminal. For example, an eUICC version (or an eUICC SVN) may be used to indicate a version of a protocol supported by an eUICC in a terminal. For example, a terminal version (a device version or a device SVN) may be used to indicate one value from among a version of a protocol supported by an LPA in a terminal and a version of a protocol supported by an eUICC. For example, a server version (or a server SVN) may be used to indicate a version of a protocol supported by a corresponding server. For example, an accepted version (or an accepted SVN) may be used to indicate a version of a protocol negotiated between a terminal and a server, and in this case, the accepted version may be one selected by the terminal or the server from among a terminal version and a server version.

Also, when "a specific entity supports a specific version", it may mean that the specific entity supports all or some functions supported by a protocol of the specific version and/or a protocol of a version earlier than the specific version". When a version of a specific entity is obvious, transmission of version information of the specific entity may be omitted.

Also, the term "version", as used herein, may be represented by a combination (hereinafter referred to as a "version number") of at least one of at least one number for indicating a corresponding version, a delimiter for distinguishing each number, or a prefix for indicating that a corresponding number means a version. For example, in a major.minor.revision type version numbering scheme using three digits, a version number of a specific entity may be represented as "v3.0.0" by using a delimiter "." and a prefix "v" or may be represented as "3.0.0" by omitting the prefix. When necessary, the number "0" may be further omitted. The above example of the version number is an example of using three digits, a specific delimiter, and a prefix, but may also be applied even when the number of digits increases or other delimiters and prefixes are used.

Also, the term "version", as used herein, may be represented by a list (hereinafter referred to as a "function list") of all or some functions defined by a protocol of a corresponding version. A function list may be written by using a character string including a delimiter or a bitmap. For example, when an entity supports both a profile download function and a profile remote management function, and the profile download function and the profile remote management function are respectively written as character strings "profileDownload" and "rpm" and are separated by using a delimiter ",", a function list may be written as "profileDownload, rpm". For example, when an entity supports a profile download function and does not support a profile remote management function, and the profile download function and the profile remote management function are respectively represented by a first bit and a second bit, a function list may be written as "10" that is a binary number. The above example is an example of writing two functions by using specific character strings, but may also be applied even when other character strings are used or the number of functions increases, and in order to notify that a specific function is not supported, it is possible to omit a character string or a bit indicator corresponding to the specific function.

Also, the term "version", as used herein, may be represented by using both a method using a version number and a method using a function list. For example, in the above example, a version may be represented as "v3.0.0, profile-Download, rpm" or "3.0.0; 10". Also, when a function defined by a protocol of a specific version is not defined in a protocol of another version and thus a version of a protocol supported by an entity is obvious in a function list written by using a character string or a bitmap, the entity may replace a version number with the function list. For example, when only a profile download function is supported in a version number of "v2.0.0" and both a profile download function and a profile remote management function are supported in a version number of "v3.0.0", an entity supporting the version number of "v3.0.0" may write "11" which is a function list, instead of writing "v3.0.0; 11" including both the version number and the function list. Also, when all functions defined in a protocol of a specific version are supported and thus a function list is obvious, an entity may replace the function list with a version number. For example, when all functions defined in a version number of "v3.0.0" are a profile download function and a profile remote management function, an entity supporting a function list "11" may write "v3.0.0" which is the version number, instead of writing "v3.0.0, 11" including both the version number and the function list.

Also, when "versions of two or more entities are the same", it may mean that all or some of one or more of version numbers or function lists of the two or more entities are the same and it does not mean that all of the version numbers and the function lists are the same. For example, when a version number of a terminal is "v3.0.1" and a version number of a server is "3.0.0", major versions of the terminal and the server are the same, and thus it may be expressed that "versions of the terminal and the server are the same".

Also, when there are two or more entities, and "entity A supports entity B" or "entity B supports entity A", it may mean that all or some of one or more of version numbers or function lists of the entities A and B are the same, and it does not mean that all of the version numbers and the function lists are the same. For example, when a version number of a terminal is "v3.0.1" and a version number of a server is "3.0.0", major versions of the terminal and the server are the same, and thus it may be expressed that "the terminal supports the server" or "the server supports the terminal". For example, when a function list of a terminal is "profile-Download, rpm" and a function list of a server is "1.0", both the terminal and the server support a profile download function, and thus it may be expressed that "the terminal supports the server" or "the server supports the terminal".

The term "AKA" stands for authentication and key agreement and may indicate an authentication algorithm for accessing 3rd generation partnership project (3GPP) and 3GPP2 networks.

The term "K", as used herein, is an encryption key value stored in an eUICC used for an AKA authentication algorithm.

The term "OPc", as used herein, is a parameter value that may be stored in an eUICC used for an AKA authentication algorithm.

The term "NAA", as used herein, may be a network access application program and may be an application program such as a USIM or an ISIM stored in an UICC to access a network. An NAA may be a network access module.

As described above, a SIM card in the disclosure stores personal information of a mobile communication subscriber and performs subscriber authentication and traffic security key generation when access is made to a mobile communication network, thereby making it possible to stably use mobile communication. A SIM card is manufactured as a dedicated card for a specific mobile network operator according to the request of the mobile network operator. Authentication information for accessing a network of the mobile communication operator, for example, a USIM application and international mobile subscriber identity (IMSI), a K value, and an OPc value is stored in advance in the SIM card before shipping. Accordingly, the manufactured SIM card is delivered to the mobile communication operator and the mobile communication operator may provide the SIM card to a subscriber. Later, when necessary, management, such as installation, correction, and deletion, of applications in a UICC may be performed by using technology such as OTA. The subscriber may use the network and application services of the mobile communication operator by inserting a UICC card into the subscriber's mobile communication terminal. When replacing the terminal with a new terminal, the subscriber may use the authentication information, mobile communication phone number, personal phonebook, stored in the UICC card as they are in the new terminal by taking out the UICC card from the old terminal and inserting the UICC card into the new terminal.

However, a SIM card causes inconvenience to a user of a mobile communication terminal when he or she receives services from other mobile communication operators because the user has to physically obtain the SIM card in order to receive services from the other mobile communication operators. For example, in order for a user traveling abroad to use a local mobile communication service, the user has to purchase a local SIM card, which causes inconvenience. A roaming service may somewhat reduce the inconvenience, but there is a problem in that the user may be unable to receive the local mobile communication service due to expensive fees or a nonexistent agreement between communication service providers.

When a SIM module is remotely downloaded and installed in a UICC card, the above inconvenience may be considerably reduced. In this case, the user may download a SIM module of a mobile communication service to be used into the UICC card at a desired time. A plurality of SIM modules may be downloaded and installed in the UICC card, and one of the downloaded SIM modules may be selected to be used. Such a UICC card may be or may not be fixed to a terminal. In particular, a UICC fixed to a terminal is referred to as an eUICC. In general, an "eUICC" refers to a UICC card which is fixed to a terminal and may remotely download and select a SIM module. In the disclosure, a UICC card capable of remotely downloading and selecting a SIM module is referred to as an eUICC. That is, a UICC card that is fixed to or is not fixed to a terminal among UICC cards capable of remotely downloading and selecting a SIM module is referred to as an eUICC. Further, downloaded SIM module information is referred to as an eUICC profile.

In the disclosure, a method and apparatus for installing an eSIM profile by using text, a method and apparatus for establishing a communication connection by downloading and installing a communication service to a terminal in a communication system, and a method and apparatus for downloading, installing, and managing a profile online in a communication system will be described.

In the disclosure, a method and apparatus for establishing a communication connection by allowing a terminal to select a communication service in a communication system, a method and apparatus for allowing a terminal to download, install, and manage a profile for establishing a communication connection online in a communication system, a method and apparatus for allowing a terminal to efficiently determine a version of a profile server and request an event based on the version in a communication system, a method of allowing a terminal to notify a profile server about at least one version of an eUICC in the terminal when accessing the profile server, a method of allowing a terminal to determine a version of a profile server through server version information included in a message of the profile server, or a method of allowing a profile server to determine a version of an eUICC in a terminal through at least one eUICC version information included in a message of the terminal will be described.

FIG. 1 is a diagram illustrating a mobile communication network connection method of a terminal using a UICC in which a profile fixed to a terminal is installed, according to an embodiment of the disclosure.

As shown in FIG. 1, a UICC 120 may be inserted into a terminal 110. For example, the UICC 120 may be detachable, or may be previously embedded in the terminal 110.

In the UICC 120 in which the fixed profile is installed, the fixed profile means that 'access information' for accessing a specific communication service provider is fixed. For example, the access information may include an IMSI that is a subscriber identifier and a K or Ki value needed to authenticate a subscriber to a network along with the subscriber identifier.

The terminal 110 according to various embodiments of the disclosure may perform authentication along with an authentication processing system (e.g., a home location register (HLR) or an authentication center (AuC)) of a mobile communication operator by using the UICC 120. For example, this authentication process may be an AKA process. When the authentication succeeds, the terminal 110 may use a mobile communication service such as a phone call or mobile data by using a mobile communication network 130 of a mobile communication system.

Figure 2:
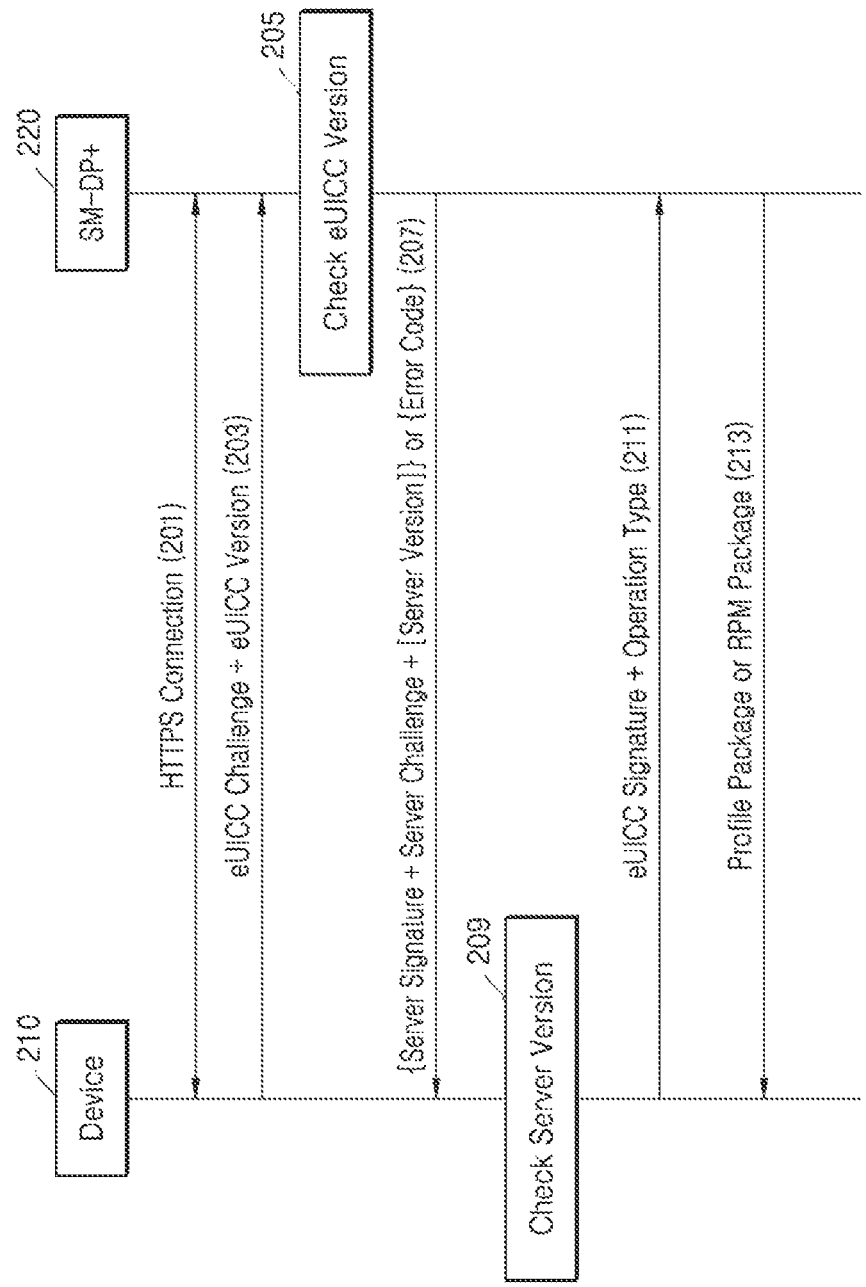
FIG. 2 is a diagram illustrating a procedure in which a terminal accesses a profile server, according to an embodiment of the disclosure.

FIG. 2 is a diagram illustrating a procedure in which a terminal accesses a profile server according to an embodiment of the disclosure.

Although not shown in FIG. 2, the terminal (device) 210 may further include an eUICC and an LPA.

Referring to FIG. 2, in operation 201, the terminal 210 and a profile server (SM-DP+) 220 may generate a hypertext transfer protocol over secure socket layer (HTTPS) connection.

In operation 203, the terminal 210 may transmit a message including at least an eUICC challenge which is a random character string generated by the eUICC and an eUICC version to the profile server 220. In operation 203, for example, an initiate authentication request message may be used.

In operation 205, the profile server 220 may check the eUICC version of the terminal 210.

When the profile server 220 supports the eUICC version of the terminal 210 as a result of operation 205, in operation 207, the profile server 220 may transmit a message including at least a server signature and a server challenge which is a random character string generated by a server and selectively further including a server version to the terminal 210.

The server signature may be a signature generated based on the eUICC challenge which is the random character string received in operation 203. When the profile server 220 does not support the eUICC version of the terminal 210 as a result of operation 205, in operation 207, the profile server 220 may transmit a message including at least an error code meaning that an SVN is not supported to the terminal 210. In operation 207, for example, an initiate authentication response message may be used.

In operation 209, the terminal 210 may check the server version of the profile server 220. When the terminal 210 does not receive server version information of the profile server 220, the terminal 210 may determine the server version of the profile server 220 based on other information transmitted by the profile server 220, which will be described below with reference to FIG. 5.

When the terminal 210 supports the server version of the profile server 220 as a result of operation 209, in operation 211, the terminal 210 may transmit a message including at least an eUICC signature and selectively further including an operation type to the profile server 220. The eUICC signature may be a signature generated based on the server challenge which is the random character string received in operation 207. When the terminal 210 does not support the server version of the profile server 220 as a result of operation 209, the terminal 210 may end operation 211 without performing operation 211. In operation 211, for example, an authenticate client request.

In operation 213, the profile server 220 may transmit at least at least one profile metadata or profile remote management command to the terminal 210. When the profile server 220 selects the profile metadata or the profile remote management command, the operation type received in operation 209 may be taken into account. In operation 213, for example, an authenticate client response authenticate client response message may be used.

Figure 3:
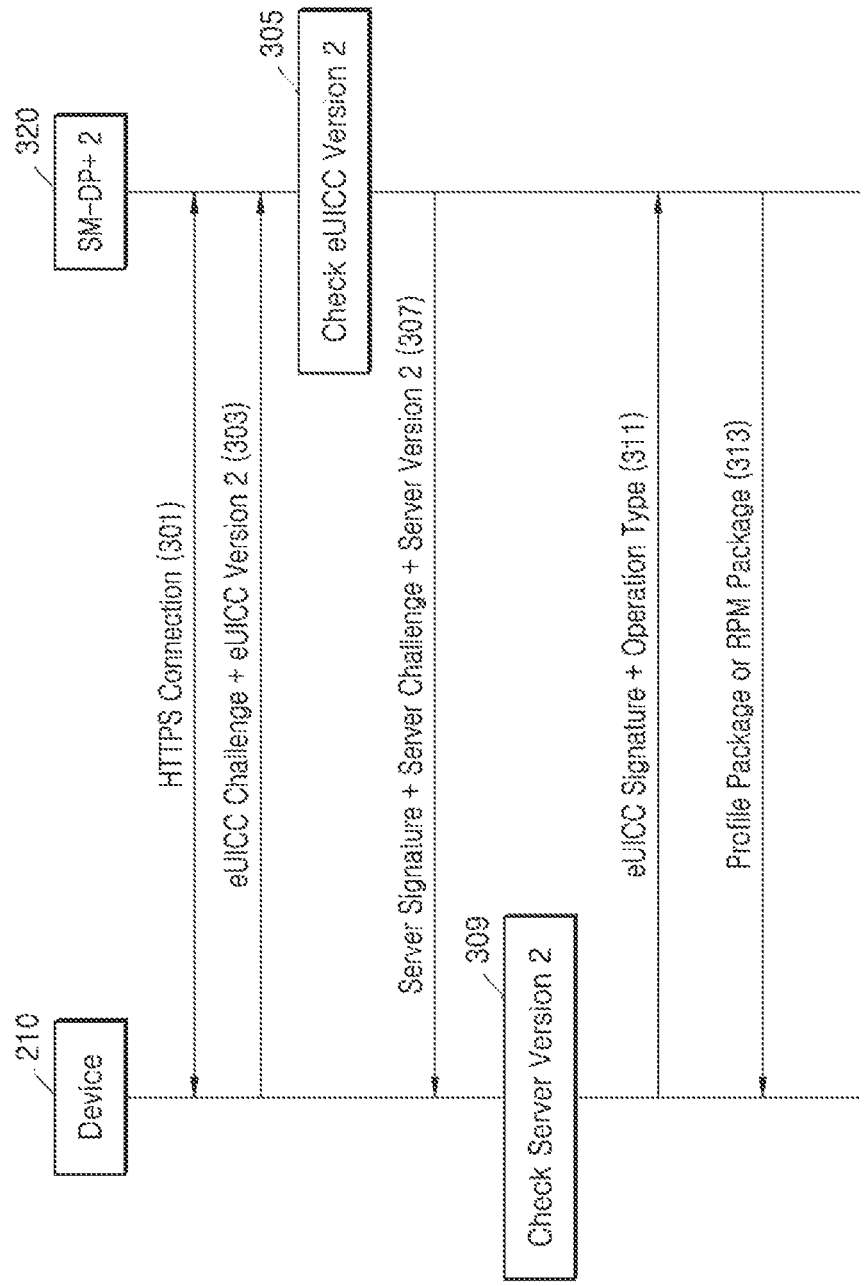
FIG. 3 is a diagram illustrating a message exchange procedure when a terminal accesses a profile server that is a same version as the terminal, according to an embodiment of the disclosure.

FIG. 3 is a diagram illustrating a message exchange procedure when a terminal accesses a profile server that is a same version as the terminal, according to an embodiment of the disclosure. Although not shown in FIG. 3, the terminal (device) 210 may further include an eUICC and an LPA.

Referring to FIG. 3, a second profile server (SM-DP+ 2) 320 may be a profile server supporting a protocol of a specific version. Also, the terminal 210 may be a terminal supporting a protocol of the same version as the second profile server 320. For convenience of explanation, a version of a protocol supported by the second profile server 320 and the terminal 210 is referred to as a version 2.

As shown in FIG. 3, in operation 301, the terminal 210 and the second profile server 320 may generate an HTTPS connection.

In operation 303, the terminal 210 may transmit a message including at least an eUICC challenge which is a random character string generated by the eUICC and an eUICC version 2 to the second profile server 320. In operation 303, for example, an initiate authentication request message may be used.

In operation 305, the second profile server 320 may check the eUICC version 2 of the terminal 210. In this case, because the version 2 of the second profile server 320 and the eUICC version 2 in the terminal 210 are the same, the second profile server 320 may determine to accept a connection of the terminal 210.

Accordingly, in operation 307, the second profile server 320 may transmit a message including at least a server signature, a server challenge which is a random character string generated by a server, and a server version 2 to the terminal 210. In operation 307, for example, an initiate authentication response message may be used.

In operation 309, the terminal 210 may check the server version 2 of the second profile server 320. In this case, because the eUICC version 2 in the terminal 210 and the version 2 of the second profile server 320 are the same, the terminal 210 may determine to accept a connection of the second profile server 320.

Accordingly, in operation 311, the terminal 210 may transmit a message including at least an eUICC signature and an operation type to the second profile server 320. The eUICC signature may be a signature generated based on the server challenge which is the random character string received in operation 307. In operation 311, for example, an authenticate client request message may be used.

In operation 313, the second profile server 320 may transmit at least at least one profile metadata or profile remote management command to the terminal 210. When the second profile server 320 selects the profile metadata or the profile remote management command, the operation type received in operation 309 may be taken into account. In operation 313, for example, an authenticate client response message may be used.

Figure 4:
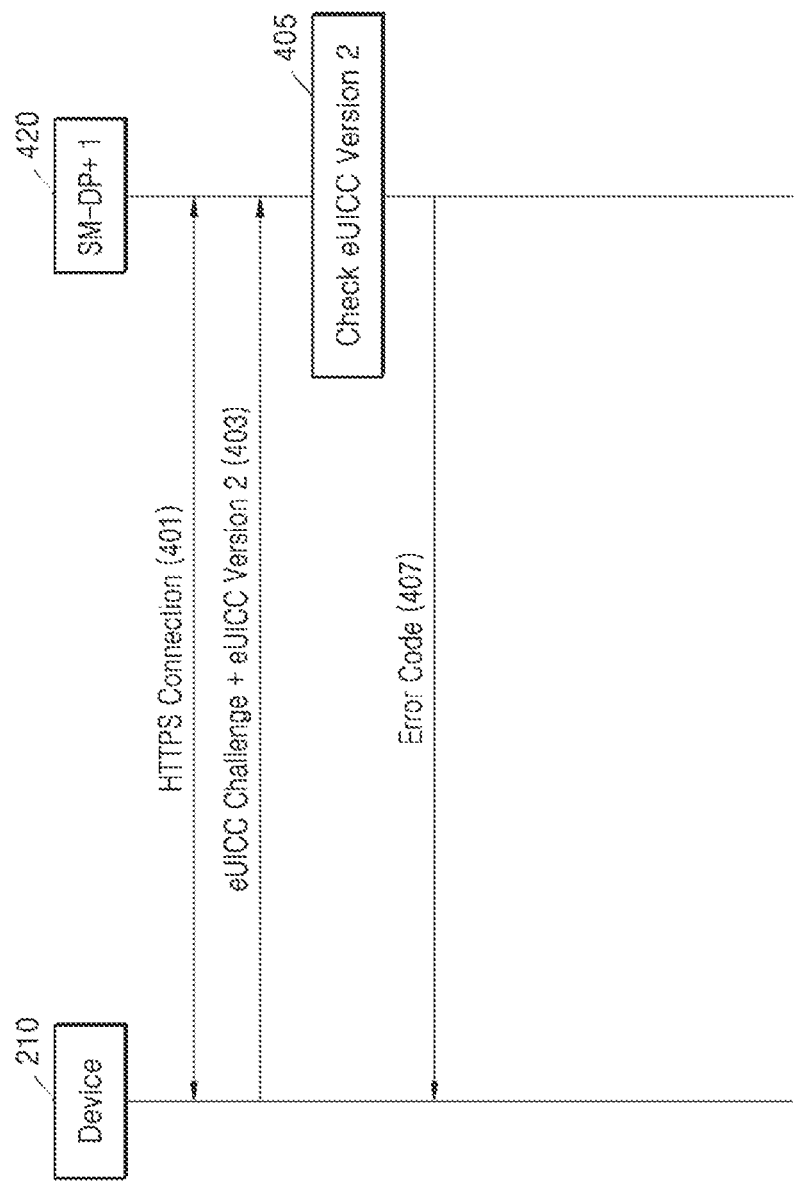
FIG. 4 is a diagram illustrating a message exchange procedure when one version information is notified. when a terminal accesses a profile server that is a version lower than that of the terminal, according to an embodiment of the disclosure.

FIG. 4 is a diagram illustrating a message exchange procedure when one version information is notified when a terminal accesses a profile server that is a version lower than that of the terminal according to an embodiment of the disclosure.

Although not shown in FIG. 4, the terminal (device) 210 may further include an eUICC and an LPA.

Referring to FIG. 4, a first profile server (SM-DP+ 1) 420 may be a profile server supporting a protocol of a specific version. Also, the terminal 210 may be a terminal supporting a protocol of a version different from that of the first profile server 420. For convenience of explanation, a version of a protocol supported by the first profile server 420 is referred to as a version 1 and a version of a protocol supported by the terminal 210 is referred to as a version 2. Functions of a version 2 protocol may include all or some of functions of a version 1 protocol, and may further include functions not included in the version 1 protocol. For example, the version 1 protocol may be a protocol supporting a profile download function, and the version 2 protocol may be a protocol supporting a profile download function and a profile remote management function. As shown in FIG. 4, in operation 401, the terminal 210 and the first profile server 420 may generate an HTTPS connection.

In operation 403, the terminal 210 may transmit a message including at least an eUICC challenge which is a random character string generated by the eUICC and an eUICC version 2 to the first profile server 420. In operation 403, for example, an initiate authentication request may be used.

In operation 405, the first profile server 420 may check the eUICC version 2 of the terminal 210. In this case, because the version 1 protocol of the first profile server 420 does not support some of functions of the version 2 protocol of the eUICC in the terminal 210, the first profile server 420 may determine to reject a connection of the terminal 210.

Accordingly, in operation 407, the first profile server 420 may transmit a message including at least an error code meaning that an SVN is not supported to the terminal 210. In operation 407, for example, an initiate authentication response message may be used.

Referring to FIG. 4, because the version 2 of the terminal 210 supports all functions of the version 1 of the first profile server 420, when the terminal 210 uses only functions defined even in the version 1 from among functions of the version 2, the terminal 210 should be able to interwork with the first profile server 420. However, when the first profile server 420 simply refers to only version 2 information of the terminal 210, a connection of the terminal 210 is rejected as in operation 407, and thus an operation is impossible.

Figure 5:
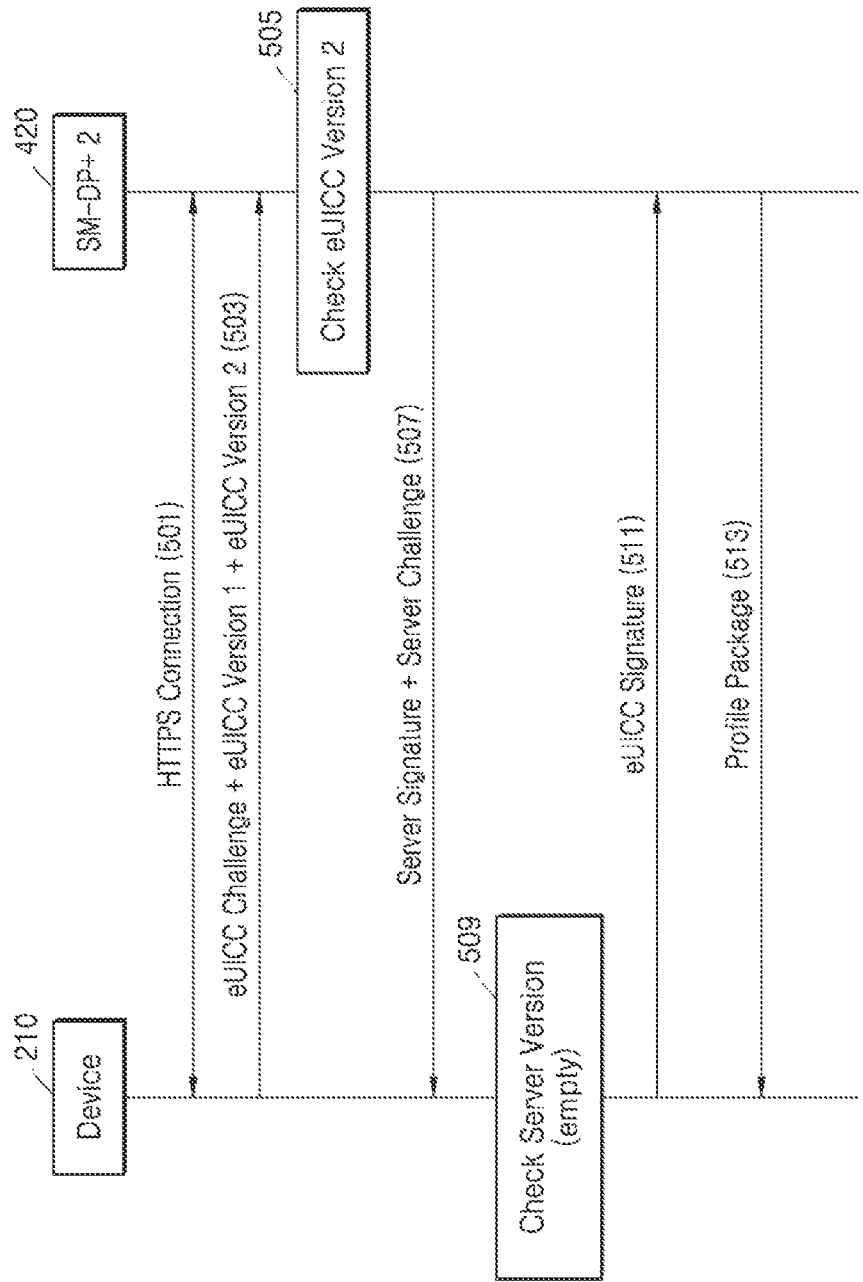
FIG. 5 is a diagram illustrating a message exchange procedure when at least one version information is notified when a terminal accesses a profile server that is a version lower than that of the terminal, according to an embodiment of the disclosure.

FIG. 5 is a diagram illustrating a message exchange procedure when at least one version information is notified when a terminal accesses a profile server that is a version lower than that of the terminal, according to an embodiment of the disclosure.

Although not shown in FIG. 5, the terminal (device) 210 may further include an eUICC and an LPA.

Referring to FIG. 5, the first profile server (SM-DP+ 1, 420) may be a profile server supporting a protocol of a specific version. Also, the terminal 210 may be a terminal supporting a protocol of a version different from that of the first profile server 420. For convenience of explanation, a version of a protocol supported by the first profile server 420 is referred to as a version 1, and a version of a protocol supported by the terminal 210 is referred to as a version 2. Function of a version 2 protocol may include all or some of functions of a version 1 protocol, and may further include functions not included in the version 1 protocol. For example, the version 1 protocol may be a protocol supporting a profile download function, and the version 2 protocol may be a protocol supporting a profile download function and a profile remote management function. As shown in FIG. 5, in operation 501, the terminal 210 and the first profile server 420 may generate an HTTPS connection.

In operation 503, the terminal 210 may transmit a message including at least an eUICC challenge which is a random character string generated by the eUICC, an eUICC version 1, and an eUICC version 2 to the first profile server 420. In this case, eUICC version 1 information may have a format that may be recognized by a server supporting the version 1 and a server supporting the version 2, and may indicate a lowest version which enables the terminal 210 to access the first profile server 420. Also, eUICC version 2 information may have a format that may be recognized by a server supporting the version 2 and may not be recognized by a server supporting the version 1, and may indicate a highest version which enables the terminal 210 to access the first profile server 420. For example, the term "format" may be a binary data format starting with a specific tag. In operation 503, for example, an initiate authentication request message may be used.

In operation 505, the first profile server 420 may check the eUICC version 1 of the terminal 210 which is recognizable and may ignore the eUICC version 2 which is unrecognizable. In this case, because the version 1 of the first profile server 420 and the eUICC version 1 in the terminal 210 are the same, the first profile server 420 may determine to accept a connection of the terminal 210.

Accordingly, in operation 507, the first profile server 420 may transmit a message including at least a server signature and a server challenge which is a random character string generated by a server to the terminal 210. In this case, the first profile server 420 may be set not to transmit a server version. In operation 507, for example, an initiate authentication response message may be used.

In operation 509, the terminal 210 may check that the first profile server 420 does not transmit the server version, and thus may determine that a version of the first profile server 420 is the version 1. In this case, because the first profile server 420 supports the version 1, the terminal 210 may determine to accept a connection of the first profile server 420 and to use only functions defined in the version 1 protocol.

In operation 511, the terminal 210 may transmit a message including at least an eUICC signature to the first profile server 420. In this case, because the terminal 210 determines to use only the functions defined in the version 1 protocol in operation 509, when an operation of supported in the version 1 protocol is obvious, transmission of an operation type may be omitted in operation 511. The eUICC signature may be a signature generated based on the server challenge which is the random character string received in operation 507. In operation 511, for example, an authenticate client request message may be used.

In operation 513, the first profile server 420 may transmit at least profile metadata to the terminal 210. In operation 513, an authenticate client response message may be used.

Referring to FIG. 5, unlike in FIG. 4, the terminal 210 supporting both the version 1 and the version 2 may generate a connection with the first profile server 420 supporting only the version 1 by notifying both the version 1 and the version 2 to the first profile server 420. Also, the terminal 210 may save network resources unnecessarily wasted in requesting functions not supported by the first profile server 420 by determining that the first profile server 420 supports the version 1 and using only functions included in the version 1.

Figure 6:
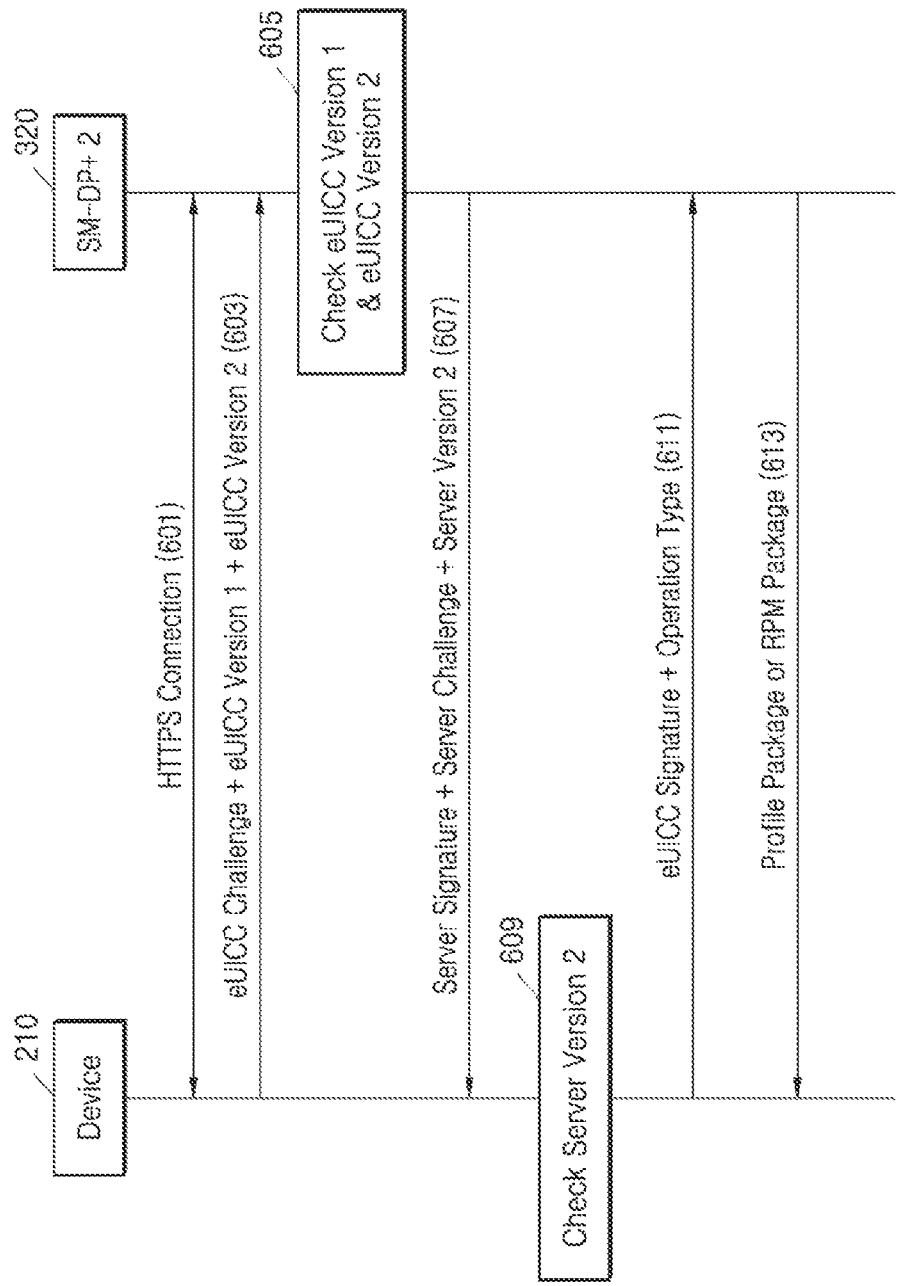
FIG. 6 is a diagram illustrating a message exchange procedure when at least one version information is notified when a terminal accesses a profile server that is the same version as the terminal, according to an embodiment of the disclosure.

FIG. 6 is a diagram illustrating a message exchange procedure when at least one version information is notified when a terminal accesses a profile server that is the same version as the terminal, according to an embodiment of the disclosure.

Although not shown in FIG. 6, the terminal (device) 210 may further include an eUICC and an LPA.

Referring to FIG. 6, the second profile server (SM-DP+ 2) 320 may be a profile server supporting a protocol of a specific version. Also, the terminal 210 may be a terminal supporting a protocol of the same version as the second profile server 320. For convenience of explanation, a version of a protocol supported by the second profile server 320 and the terminal 210 is referred to as a version 2.

As shown in FIG. 6, in operation 601, the terminal 210 and the second profile server 320 may generate an HTTPS connection.

In operation 603, the terminal 210 may transmit a message including at least an eUICC challenge which is a character string generated by the eUICC, an eUICC version 1, and an eUICC version 2 to the second profile server 320. In this case, eUICC version 1 information may have a format which may be recognized by both a server supporting a version 1 and a server supporting the version 2. Also, eUICC version 2 information may have a format which may be supported by a server supporting the version 2 and may not be recognized by a server supporting the version 1. For example, the term "format" may be a binary data format starting with a specific tag. In operation 603, for example, an initiate authentication request message may be used.

In operation 605, the second profile server 320 may check the eUICC version 1 and the eUICC version 2 of the terminal 210. In this case, because the version 2 of the second profile server 320 and the eUICC version 2 in the terminal 210 are the same, the second profile server 320 may determine to accept a connection of the terminal 210.

Accordingly, in operation 607, the second profile server 320 may transmit a message including at least a server signature, a server challenge which is a random character string generated by a server, and a server version 2 to the terminal 210. In operation 607, for example, an initiate authentication response message may be used.

In operation 609, the terminal 210 may check that the second profile server 320 transmits the server version 2, and thus may determine that a version of the second profile server 320 is the version 2. In this case, because the second profile server 320 supports the version 2, the terminal 210 may determine to accept a connection with the second profile server 320 and to use only functions defined in a version 2 protocol.

In operation 611, the terminal 210 may transmit a message including at least an eUICC signature and an operation type to the second profile server 320. The eUICC signature may be a signature generated based on the server challenge which is the random character string received in operation 607. In operation 611, for example, an authenticate client request message may be used.

In operation 613, the second profile server 320 may transmit at least at least one profile metadata or profile remote management command. In operation 613, for example, an authenticate client response message may be used.

Referring to FIG. 6, the terminal 210 supporting both the version 1 and the version 2 may generate a connection with the second profile server 320 supporting only the version 2.

Figure 7:
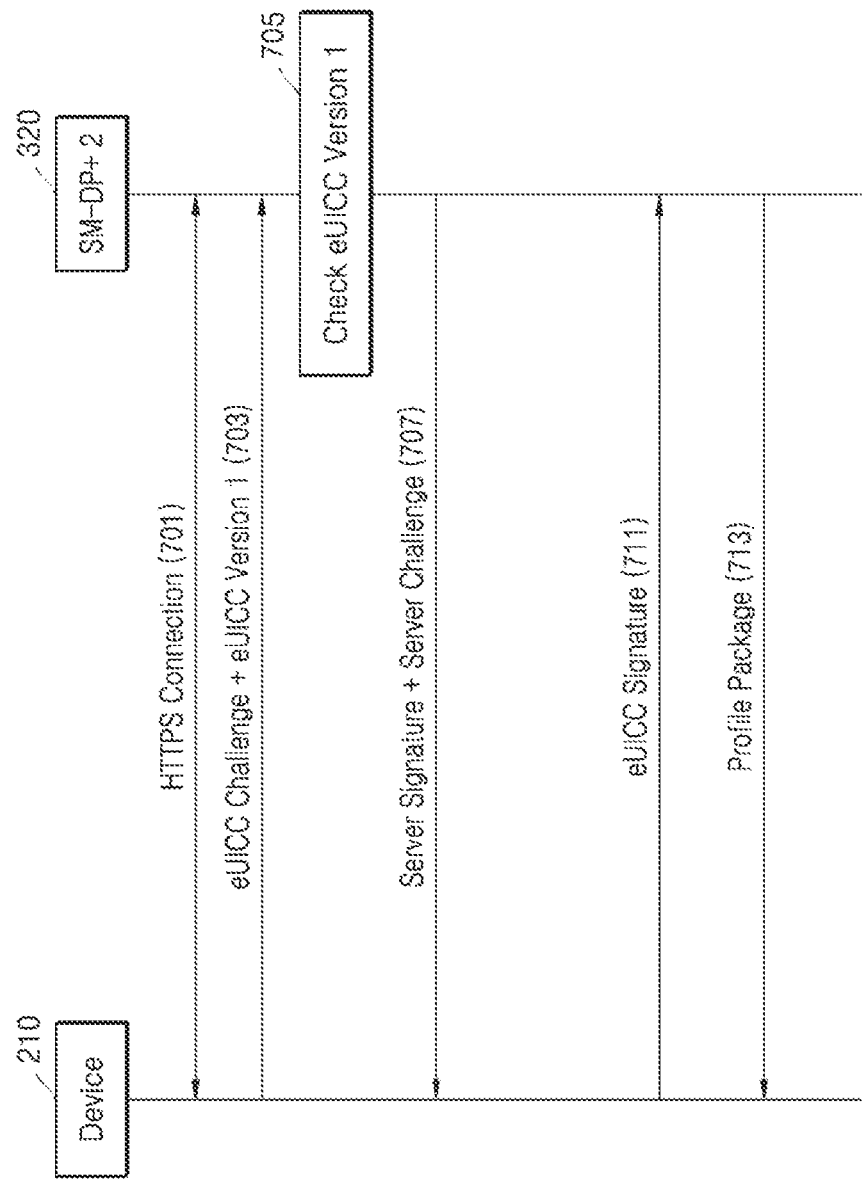
FIG. 7 is a diagram illustrating a message exchange procedure when one version information is notified when a terminal accesses a profile server that is a version higher than that of the terminal, according to an embodiment of the disclosure.

FIG. 7 is a diagram illustrating a message exchange procedure when one version information is notified when a terminal accesses a profile server that is a version higher than that of the terminal, according to an embodiment of the disclosure.

Although not shown in FIG. 7, a terminal (device) 710 may further include an eUICC and an LPA.

Referring to FIG. 7, the second profile server (SM-DP+ 2) 320 may be a profile server supporting a protocol of a specific version. Also, the terminal 710 may be a terminal supporting a protocol of a version different from that of the second profile server 320. For convenience of explanation, a version of a protocol supported by the second profile server 320 is referred to as a version 2, and a version of a protocol supported by the terminal 710 is referred to as a version 1. A function of a version 2 protocol may include all or some of functions of a version 1 protocol, and may further include functions not included in the version 1 protocol. For example, the version 1 protocol may be a protocol supporting a profile download function, and the version 2 protocol may be a protocol supporting a profile download function and a profile remote management function.

As shown in FIG. 7, in operation 701, the terminal 710 the second profile server 320 may generate an HTTPS connection.

In operation 703, the terminal 710 may transmit a message including at least an eUICC challenge which is a random character string generated by the eUICC and an eUICC version 1 to the second profile server 320. In this case, eUICC version 1 information may have a format which may be recognized by both a server supporting the version 1 and a server supporting the version 2. For example, the term "format" may be a binary data format starting with a specific tag. In operation 703, for example, an initiate authentication request message may be used.

In operation 705, the second profile server 320 may check the eUICC version 1 of the terminal 710. In this case, because the version 2 supported by the second profile server 320 supports all functions of the version 1 supported by the eUICC in the terminal 710, the second profile server 320 may determine to accept a connection of the terminal 710.

Accordingly, in operation 707, the second profile server 320 may transmit a message including at least a server signature and a server challenge which is a random character string generated by a server to the terminal 710. In this case, in order to express acceptance of a protocol of the version 1, the second profile server 320 may omit transmission of a server version 2. In operation 707, for example, an initiate authentication response message may be used.

In operation 711, the terminal 710 may omit checking of the server version 2, and may transmit at least an eUICC signature to the second profile server 320. In this case, the terminal 710 may further omit transmission of an operation type. The eUICC signature may be a signature generated based on the server challenge which is the random character string received in operation 707. In operation 711, for example, an authenticate client request message may be used.

In operation 713, the second profile server 320 may transmit at least at least one profile metadata to the terminal 710. In operation 713, for example, an authenticate client response message may be used.

Referring to FIG. 7, the terminal 710 supporting only the version 1 may generate a connection with the second profile server 320 supporting both the version 1 and the version 2.

Figure 8:
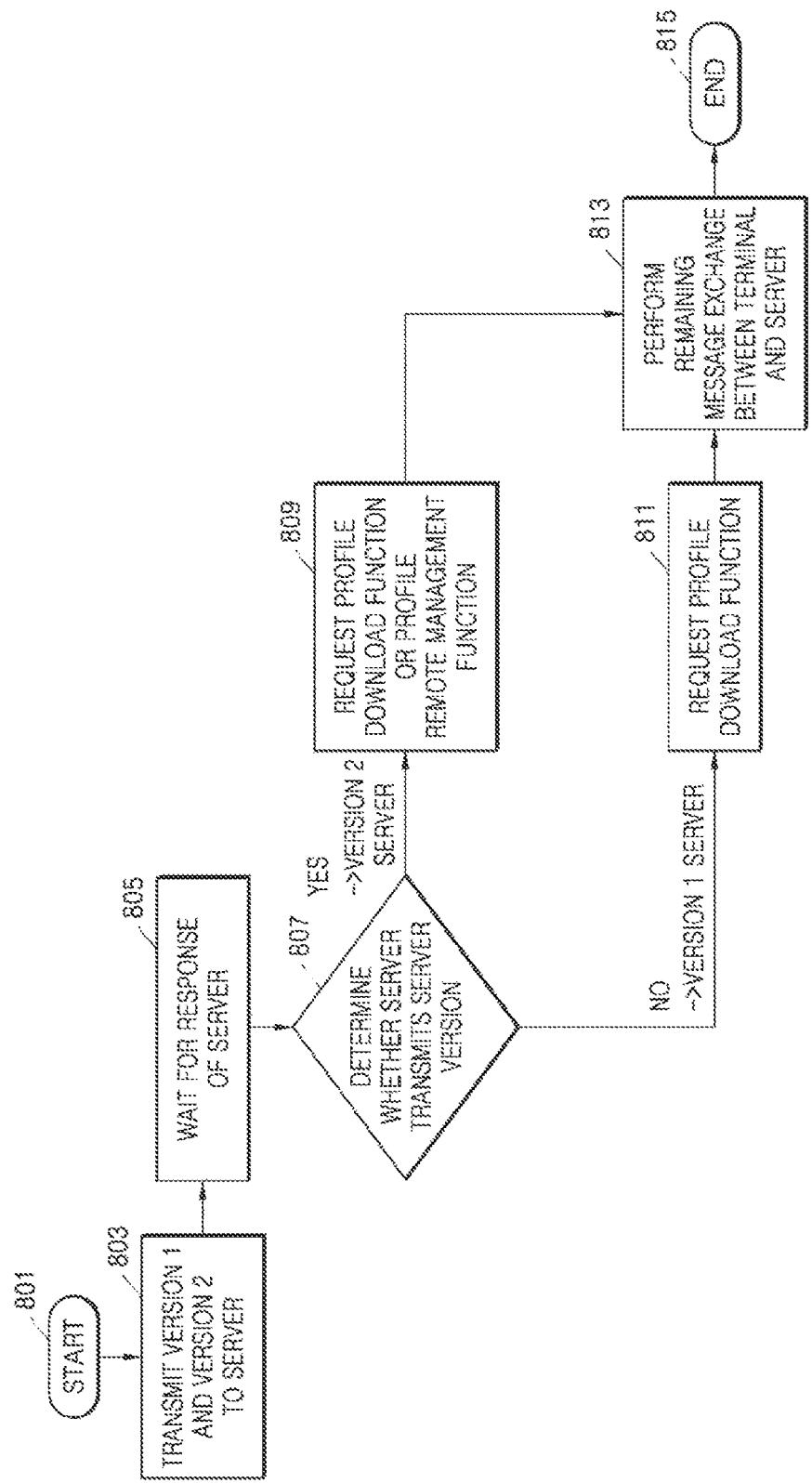
FIG. 8 is a flowchart illustrating an operation of a terminal according to an embodiment of the disclosure.

FIG. 8 is a flowchart illustrating an operation of a terminal according to an embodiment of the disclosure.

The terminal 210 of FIG. 8 may be a terminal supporting both version 1 and a version 2 as described with reference to FIGS. 5, 6, and 7.

In operation 801, the terminal 210 may start an operation. Although not shown in FIG. 8, operation 801 may include generating an HTTPS connection between the terminal 210 and a profile server.

In operation 803, the terminal 210 may transmit a message including at least an eUICC version 1 and an eUICC version 2 to the profile server. In operation 803, for example, an initiate authentication request message may be used. Operation 803 corresponds to operation 903 of FIG. 9.

In operation 805, the terminal 210 may wait for a response of the profile server. Operation 805 may be, for example, an operation of waiting for an initiate authentication response message. Operation 805 corresponds to operations 909 through 911 of FIG. 9.

In operation 807, the terminal 210 may check whether server version information is included in the response of the profile server. When the server version information is included in the response of the profile server, the terminal 210 may perform operation 809. When the server version information is not included in the response of the profile server, the terminal 210 may perform operation 811.

In operation 809, the terminal 210 may check that the profile server is a server supporting the version 2, and may request a profile download operation or a profile remote management operation. To this end, the terminal 210 may transmit a message including at least an eUICC signature and an operation type to the profile server. In operation 809, for example, an authenticate client request message may be used.

In operation 811, the terminal 210 may check that the profile server is a server supporting the version 1, and may request a profile download function. To this end, the terminal 210 may transmit a message including at least an eUICC signature to the profile server. In operation 811, for example, an authenticate client request message may be used.

In operation 813, the terminal 210 may perform a remaining message exchange procedure with the profile server. In operation 813, for example, at least an authenticate client response message may be included. Operation 813 corresponds to operation 913 of FIG. 9.

In operation 815, the terminal 210 may terminate the connection with the profile server, and when necessary, may return to operation 801 and may attempt to generate a connection with another random profile server.

Figure 9:
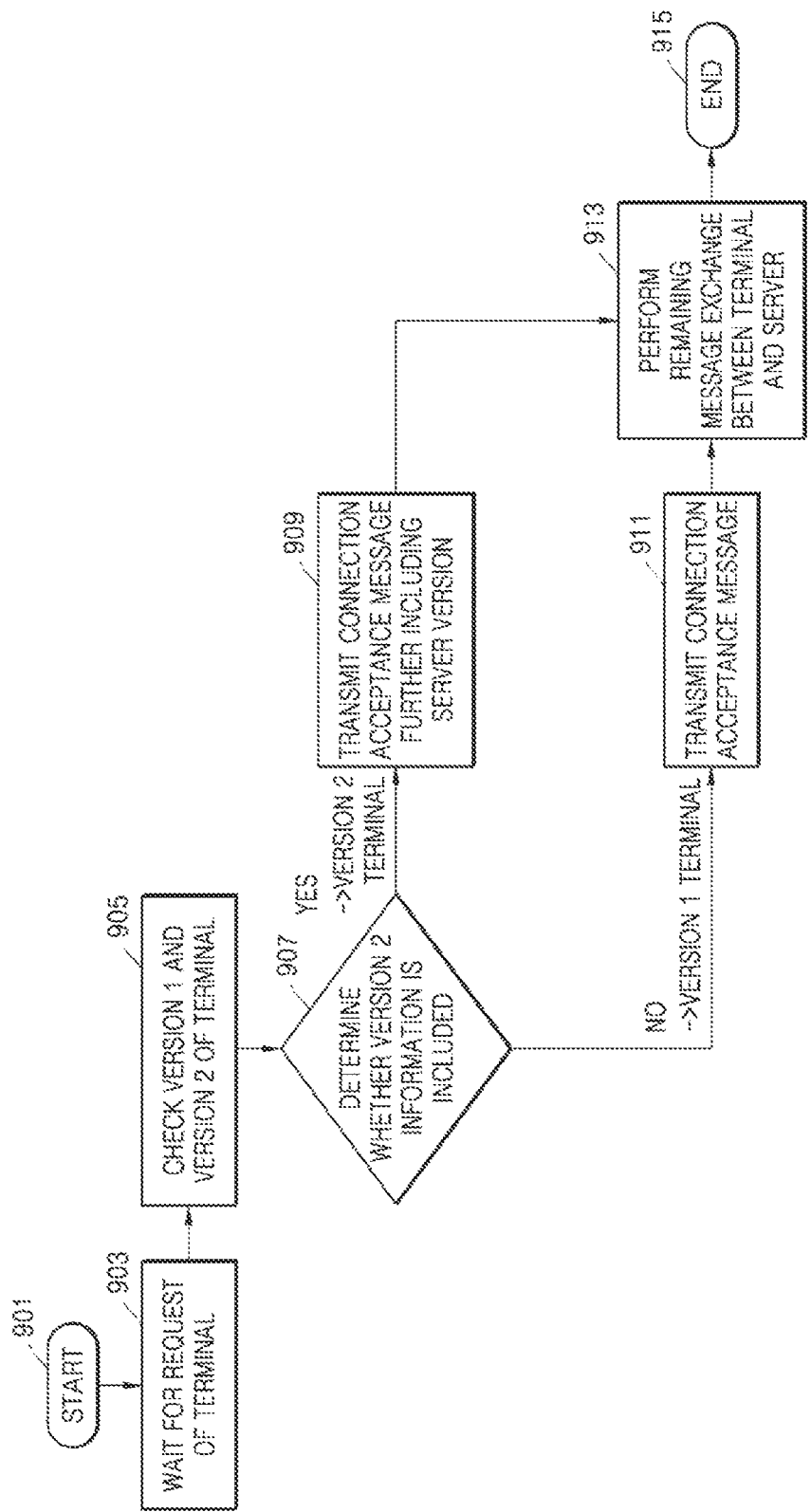
FIG. 9 is a flowchart illustrating an operation of a profile server according to an embodiment of the disclosure.

FIG. 9 is a flowchart illustrating an operation of a profile server according to an embodiment of the disclosure.

The profile server 220 of FIG. 9 may be a server supporting both a version 1 and a version 2 as described with reference to FIGS. 3, 6, and 7.

In operation 901, the profile server 220 may start an operation. Although not shown in FIG. 9, operation 901 may include generating an HTTPS connection between a terminal and the profile server 220.

In operation 903, the profile server 220 may wait for a request of the terminal. Operation 903 may be, for example, an operation of waiting for an initiate authentication request message. Operation 903 corresponds to operation 803 of FIG. 8.

In operations 905 through 907, the profile server 220 may check whether an eUICC version 1 and/or an eUICC version 2 are included in the request of the terminal. When both version 1 information and version 2 information are included, the profile server 220 may perform operation 909. When only the version 1 information is included, the profile server 220 may perform operation 911.

In operation 909, the profile server 220 may check that the terminal is a terminal supporting both the version 1 and the version 2, and may accept a version 2 connection. To this end, the profile server 220 may transmit a message including at least a server challenge which is a random character string generated by a server and a server signature and further including a server version 2 to the terminal. In operation 909, for example, an initiate authentication response may be used. Operation 909 corresponds to operation 805 of FIG. 8.

In operation 911, the profile server 220 may check that the terminal is a terminal supporting the version 1, and may accept a version 1 connection. To this end, the profile server 220 may transmit a message including at least the server challenge which is the random character string generated by the server and the server signature to the terminal. In operation 911, for example, an initiate authentication response message may be used. Operation 911 corresponds to operation 805 of FIG. 8.

In operation 913, the profile server 220 may perform a remaining message exchange procedure with the terminal. In operation 913, for example, at least an authenticate client request message may be included. Operation 913 corresponds to operations 809 through 811 and operation 813 of FIG. 8.

In operation 915, the profile server 220 may terminate the connection with the terminal, and when necessary, may return to operation 901 and may wait for a connection with another random terminal.

Figure 10:
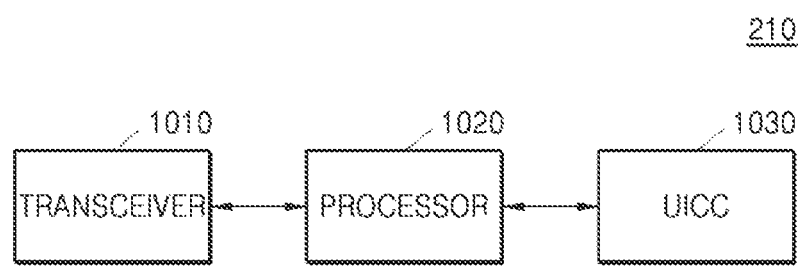
FIG. 10 is a block diagram illustrating elements of a terminal according to an embodiment of the disclosure.

FIG. 10 is a block diagram illustrating elements of a terminal according to an embodiment of the disclosure.

Referring to FIG. 10, the terminal 210 may include a transceiver 1010 and at least one processor 1020. Also, the terminal 210 may include a UICC 1030. For example, the UICC 1030 may be inserted into the terminal 210 or may be an eUICC embedded in the terminal 210.

The transceiver 1010 may transmit and receive a signal, information, data, etc. to and from the profile server 220. The transceiver 1010 according to an embodiment of the disclosure may transmit a first message including version 1 information and version 2 information to the profile server

220. Also, the transceiver 1010 may receive server version-related information from the profile server 220 in response to the first message. Furthermore, the transceiver 1010 may transmit a second message including at least an eUICC signature and selectively further including event request information to the profile server 220, based on the server version-related information. The event request information may indicate at least a profile installation function or a profile remote management function.

The transceiver 1010 according to an embodiment of the disclosure may receive event-related information from the profile server 220 in response to the second message. The event-related information received from the profile server 220 may include at least profile metadata or a profile remote management command.

The processor 1020 may control an overall operation of the terminal 210. In an embodiment of the disclosure, the processor 1020 may include at least one processor. The at least one processor 1020 according to an embodiment of the disclosure may check version information of a server, and may determine whether to transmit the event request information based on the version information of the server.

The UICC 1030 may download a profile and may install the profile. Also, the UICC 1030 may manage the profile. The UICC 1030 according to an embodiment of the disclosure may operate under the control of the processor 1020. Alternatively, the UICC 1030 may include a processor or a controller for installing the profile, or an application may be installed in the UICC 1030. A part of the application may be installed in the processor 1020.

The terminal 210 may further include a memory (not shown), and may store data such as a basic program, an application program, or setup information for an operation of the terminal 210. Also, the memory may include at least one type of storage medium from among a flash memory type, a hard disk type, a multimedia card micro type, a card type memory (e.g., an SD or XD memory), a magnetic memory, a magnetic disk, an optical disk, a random-access memory (RAM), a static random-access memory (SRAM), a read-only memory (ROM), a programmable read-only memory (PROM), and an electrically erasable programmable read-only memory (EEPROM). Also, the processor 1020 may perform various operations by using various programs, content, data, etc. stored in the memory.

Figure 11:
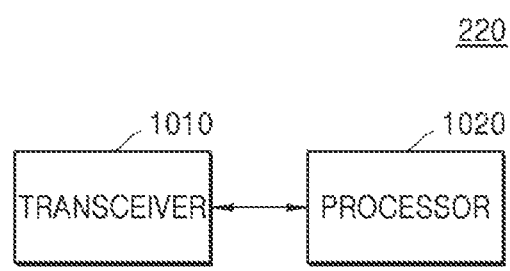
FIG. 11 is a block diagram illustrating elements of a profile server according to an embodiment of the disclosure.

FIG. 11 is a block diagram illustrating elements of a profile server according to an embodiment of the disclosure.

The profile server 220 may include a transceiver 1110 and at least one processor 1120.

The transceiver 1110 may transmit and receive a signal, information, data, etc. to and from the terminal 210. For example, the transceiver 1110 may transmit profile metadata or a profile remote management command to the terminal 210. The transceiver 1110 according to an embodiment of the disclosure may receive a first message including version 1 information and version 2 information from the terminal 210. Also, the transceiver 1110 may transmit server version information to the terminal 210. Furthermore, the transceiver 1110 may receive a second message including at least an eUICC signature and selectively further including event request information from the terminal 210. Also, the transceiver 1110 may transmit the profile metadata or the profile remote management command to the terminal 210.

The processor 1120 is an element for controlling an overall operation of the profile server 220. In an embodiment of the disclosure, the processor 1120 may include at least one processor.

The processor 1120 according to an embodiment of the disclosure may determine version information of the terminal 210 based on the version 1 information and/or the version 2 information included in the first message received from the terminal 210, and may control the transceiver 1110 to transmit or not to transmit the server version information based on the version information of the terminal 210.

Also, the processor 1120 may determine whether the event request information is included in the second message received from the terminal 210, and may control the transceiver 1110 to transmit the profile metadata or the profile remote management command based on the event request information.

The profile server 220 may further include a memory (not shown), and may store such as a basic program, an application program, and setup information for an operation of the profile server 220. Also, the memory may include at least one storage medium from among a flash memory type, a hard disk type, a multimedia card micro type, a card type memory (e.g., an SD or XD memory), a magnetic memory, an magnetic disk, an optical disk, a RAM, an SRAM, a ROM, a PROM, and an EEPROM. Also, the processor 1120 may perform various operations by using various programs, content, data, and etc. stored in the memory.

According to an embodiment of the disclosure, when a terminal in a communication system accesses a profile server, the terminal may notify at least one eUICC version information so that the profile server determines a version of an eUICC in the terminal. Also, when a terminal accesses a profile server, the terminal may additionally transmit eUICC version information having a format which may be recognized only by a profile server that is a specific version so that only the profile server that is the specific version determines the eUICC version information in the terminal. Furthermore, a terminal may check whether server version information is included in a response message of a profile server and may determine a version of the profile server. Also, a profile server may check at least one eUICC version information transmitted by a terminal, may determine a version of an eUICC in the terminal, and may determine whether to transmit server version information to the terminal.

According to the one or more embodiments of the disclosure, services may be effectively provided in a mobile communication system.

In the above embodiments of the disclosure, the elements included in the disclosure are expressed in a singular or plural form according to the proposed specific embodiment of the disclosure. However, the singular or plural expression is appropriately selected for ease of description according to the presented situation, and the disclosure is not limited to a single element or plural elements. Those elements described in a plural form may be configured as a single element, and those elements described in a singular form may be configured as plural elements.

Although various embodiments of the disclosure have been described in detail hereinabove, it should be understood that many variations and modifications may be made without departing from the spirit and scope of the disclosure as defined in the appended claims and their equivalents It should be appreciated that various embodiments of the disclosure and the terms used therein are not intended to limit the technological features set forth herein to particular embodiments of the disclosure and include various changes, equivalents, or replacements for a corresponding embodiment of the disclosure. With regard to the description of the drawings, similar reference numerals may be used to refer to similar or related elements. It is to be understood that a singular form of a noun corresponding to an item may include one or more of the things, unless the relevant context clearly indicates otherwise. Throughout the disclosure, the expression "at least one of a, b or c" indicates only a, only b, only c, both a and b, both a and c, both b and c, all of a, b, and c, or variations thereof. As used herein, such terms as "1$^{st}$" and "2$^{nd}$", or "first" and "second" may be used to simply distinguish a corresponding component from another, and does not limit the components in other aspect (e.g., importance or order). It is to be understood that when an element (e.g., a first element) is referred to, with or without the term "operatively" or "communicatively", as "coupled with", "coupled to", "connected with", or "connected to" another element (e.g., a second element), it means that the element may be coupled with the other element directly or via a third element.

The term "module", as used herein, may refer to, for example, a unit including hardware, software, firmware, or any combination thereof. For example, the term "module" may be interchangeably used with terms such as "unit," "logic,", "logical block," "component," or "circuit". The "module" may be a portion or a minimum unit of an integrated component. The "module" may be a portion or a minimum unit for performing one or more functions. For example, the "module" may include an application-specific integrated circuit (ASIC).

Various embodiments of the disclosure as set forth herein may be implemented as software (e.g., a program) including one or more instructions that are stored in a machine (e.g., a computer)-readable storage medium (e.g., an internal memory or an external memory). For example, the machine that is a device for calling instructions stored in the storage medium and operating according to the called instructions may include a terminal (e.g., the terminal 210 of FIG. 10) according to various embodiments of the disclosure. When a command is executed by a processor (e.g., the processor 1020 of FIG. 10 or the processor 1120 of FIG. 11), the processor may perform a function corresponding to the command directly or by using other elements under the control of the processor. The command may include code generated or executed by a compiler or an interpreter.

The machine-readable storage medium may be provided as a non-transitory storage medium. Here, 'non-transitory' means that the storage medium does not include a signal and is tangible, but does not include distinguish whether data is stored semi-permanently or temporarily in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™). When distributed online, at least part of the computer program product may be temporarily generated or at least temporarily stored in the machine-readable storage medium, such as a memory of a manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described sub-components may be omitted, or one or more other sub-components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by modules, programs, or other components may be carried out sequentially, in parallel, repeatedly, or heuristically, or one or more of the operations may be executed in a different order or omitted, or one or more other operations may be added.

What is claimed is:

1. A method, performed by a terminal, of negotiating an embedded universal integrated circuit card (eUICC) version in a wireless communication system, wherein an eUICC is a UICC that is removable or non-removable from the terminal, the method comprising:

establishing a hypertext transfer protocol over secure socket layer (HTTPS) connection with a server;

transmitting eUICC information comprising information about the eUICC version to the server through the HTTPS connection; and receiving server information corresponding to the eUICC information from the server, wherein the information about the eUICC version comprises a minimum eUICC version and a maximum eUICC version that are available when the terminal accesses the server.

2. The method of claim 1, wherein the server information corresponding to the eUICC information comprises an error message, wherein the method further comprises determining that the server does not support the eUICC version supported by the terminal.

3. The method of claim 1, wherein the eUICC information comprises a list of all or some of functions defined by a protocol of the eUICC version.

4. The method of claim 3, wherein the list is written by using a bitmap.

5. The method of claim 1, further comprising performing an authentication process with the server based on the server information corresponding to the eUICC information.

6. A method, performed by a server, of negotiating an embedded universal integrated circuit card (eUICC) version in a wireless communication system, wherein an eUICC is a UICC that is removable or non-removable from a terminal, the method comprising:

establishing a hypertext transfer protocol over secure socket layer (HTTPS) connection with a terminal;

receiving eUICC information comprising information about the eUICC version from the terminal through the HTTPS connection; and transmitting server information corresponding to the eUICC information to the terminal, wherein the information about the eUICC version comprises a minimum eUICC version and a maximum eUICC version that are available when the terminal accesses the server.

7. The method of claim 6, wherein the transmitting of the server information corresponding to the eUICC information comprises:

when the server supports both the minimum eUICC version and the maximum eUICC version or supports the maximum eUICC version, generating the server information comprising information about a server version corresponding to the maximum eUICC version.

8. The method of claim 7, wherein the server information comprises a list of all or some of functions defined by a protocol of the server version.

9. The method of claim 8, wherein the list is written by using a bitmap.

10. The method of claim 6, wherein the transmitting of the server information corresponding to the eUICC information to the terminal comprises:
when the server supports the minimum eUICC version, generating the server information not comprising information about a server version.

11. A terminal negotiating an embedded universal integrated circuit card (eUICC) version in a wireless communication system, wherein an eUICC is a UICC that is removable or non-removable from the terminal, the terminal comprising:
a transceiver; and
at least one processor coupled with the transceiver and configured to:
establish a hypertext transfer protocol over secure socket layer (HTTPS) connection with a server;
transmit eUICC information comprising information about the eUICC version to the server through the HTTPS connection; and
receive server information corresponding to the eUICC information from the server,
wherein the information about the eUICC version comprises a minimum eUICC version and a maximum eUICC version that are available when the terminal accesses the server.

12. The terminal of claim 11, wherein:
the server information corresponding to the eUICC information comprises an error message; and
the processor is configured to determine that the server does not support the eUICC version supported by the terminal.

13. The terminal of claim 11, wherein the eUICC information comprises a list of all or some of functions defined by a protocol of the eUICC version.

14. The terminal of claim 13, wherein the list is written by using a bitmap.

15. The terminal of claim 11, wherein the processor is configured to perform an authentication process with the server based on the server information corresponding to the eUICC information.

16. A server negotiating an embedded universal integrated circuit card (eUICC) version in a wireless communication system, wherein an eUICC is a UICC that is removable or non-removable from a terminal, the server comprising:
a transceiver; and
at least one processor coupled with the transceiver and configured to:
establish a hypertext transfer protocol over secure socket layer (HTTPS) connection with a terminal;
receive eUICC information comprising information about the eUICC version from the terminal through the HTTPS connection; and
transmit server information corresponding to the eUICC information to the terminal,
wherein the information about the eUICC version comprises a minimum eUICC version and a maximum eUICC version that are available when the terminal accesses the server.

17. The server of claim 16, wherein the processor is further configured to generate the server information comprising information about a server version corresponding to the maximum eUICC version, when the server supports both the minimum eUICC version and the maximum eUICC version or supports the maximum eUICC version.

18. The server of claim 17, wherein the server information comprises a list of all or some of functions defined by a protocol of the server version.

19. The server of claim 18, wherein the list is written by using a bitmap.

20. The server of claim 16, wherein the processor is further configured to generate the server information not comprising information about a server version, when the server supports the minimum eUICC version.

* * * * *